United States Patent
Fu et al.

(10) Patent No.: US 12,063,335 B2
(45) Date of Patent: Aug. 13, 2024

(54) IMAGE PROCESSING METHOD, IMAGE PROCESSING DEVICE, AND COMPUTER DEVICE

(71) Applicant: TCL China Star Optoelectronics Technology Co., Ltd., Guangdong (CN)

(72) Inventors: Cailing Fu, Guangdong (CN); Yunna Chen, Guangdong (CN); Jhenwei He, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 380 days.

(21) Appl. No.: 17/600,328

(22) PCT Filed: Jun. 15, 2021

(86) PCT No.: PCT/CN2021/100153
§ 371 (c)(1),
(2) Date: Sep. 30, 2021

(87) PCT Pub. No.: WO2022/156129
PCT Pub. Date: Jul. 28, 2022

(65) Prior Publication Data
US 2023/0105393 A1    Apr. 6, 2023

(30) Foreign Application Priority Data
Jan. 19, 2021  (CN) .......................... 202110066060.3

(51) Int. Cl.
| | |
|---|---|
| *G06K 9/00* | (2022.01) |
| *G06T 7/11* | (2017.01) |
| *G06V 10/25* | (2022.01) |
| *G06V 10/56* | (2022.01) |
| *G06V 10/60* | (2022.01) |
| *H04N 1/60* | (2006.01) |

(52) U.S. Cl.
CPC .................. *H04N 1/60* (2013.01); *G06T 7/11* (2017.01); *G06V 10/25* (2022.01); *G06V 10/56* (2022.01);
(Continued)

(58) Field of Classification Search
CPC .................. G09G 5/02; G09G 2340/06; G09G 2320/0233; G09G 2320/0626;
(Continued)

(56) References Cited

U.S. PATENT DOCUMENTS

| | | | |
|---|---|---|---|
| 2012/0033875 A1 | 2/2012 | Bergman et al. | |
| 2012/0200683 A1* | 8/2012 | Oshima ................. | A61B 1/045 348/E7.085 |

(Continued)

FOREIGN PATENT DOCUMENTS

| | | |
|---|---|---|
| CN | 102752477 | 10/2012 |
| CN | 103854261 | 6/2014 |

(Continued)

OTHER PUBLICATIONS

International Search Report and the Written Opinion Dated Oct. 21, 2021 From the International Searching Authority Re. Application No. PCT/CN2021/100153 and Its Translation Into English. (15 Pages).

(Continued)

*Primary Examiner* — Alex Kok S Liew

(57) ABSTRACT

The present application discloses an image processing method, an image processing device, and a computer device. The image processing method includes: acquiring a first to-be-processed chromaticity data set and a second to-be-processed chromaticity data set of a preset color of a to-be-processed picture, acquiring a Gaussian probability of the preset color, identifying a picture region in the to-be-processed picture that contains the preset color of the preset (Continued)

scene, and acquiring a color output correction value. The method of the present application can effectively improve a color cast phenomenon and a quality of the displayed picture.

19 Claims, 3 Drawing Sheets

(52) U.S. Cl.
CPC .... *G06V 10/60* (2022.01); *G06T 2207/10024* (2013.01); *G06T 2207/20076* (2013.01)

(58) Field of Classification Search
CPC ..... G09G 2320/066; G09G 2320/0666; G09G 2330/023; G06T 11/001; G06T 2207/10024; G06T 5/009; G06T 5/002; G06T 5/10; G06T 5/20; G06T 5/40; G06T 2207/20076; G06T 7/11; G06T 7/90
See application file for complete search history.

(56) References Cited

U.S. PATENT DOCUMENTS

| | | | | |
|---|---|---|---|---|
| 2012/0262473 | A1* | 10/2012 | Kim | H04N 1/6091 345/589 |
| 2014/0099027 | A1* | 4/2014 | Watanabe | H04N 1/6027 382/167 |
| 2015/0002904 | A1* | 1/2015 | Nakamura | G06T 5/009 358/3.01 |
| 2016/0293138 | A1 | 10/2016 | Zhang | |
| 2018/0316927 | A1 | 11/2018 | Alakuijala et al. | |

FOREIGN PATENT DOCUMENTS

| | | |
|---|---|---|
| CN | 105678813 | 6/2016 |
| CN | 107424179 | 12/2017 |
| CN | 109448653 | 3/2019 |
| CN | 112106102 | 12/2020 |
| CN | 112907457 | 6/2021 |
| EP | 3001668 | 3/2016 |
| WO | WO 2020/125631 | 6/2020 |

OTHER PUBLICATIONS

Zhang et al. "A Novel Local Dimming Algorithm to Improve Image Contrast and Visual Quality", Chinese Journal of Engineering, 39(12): 1888-1897, Dec. 31, 2017 & English Abstract.
Notification of Office Action and Search Report Dated Feb. 1, 2024 From The State Intellectual Property Office of the People's Republic of China Re. Application No. 202110066060.3 and Its Translation Into English. (15 Pages).

* cited by examiner

IMAGE PROCESSING METHOD, IMAGE PROCESSING DEVICE, AND COMPUTER DEVICE

RELATED APPLICATIONS

This application is a National Phase of PCT Patent Application No. PCT/CN2021/100153 having International filing date of Jun. 15, 2021, which claims the benefit of priority of Chinese Patent Application No. 202110066060.3 filed on Jan. 19, 2021. The contents of the above applications are all incorporated by reference as if fully set forth herein in their entirety.

FIELD AND BACKGROUND OF THE INVENTION

The present application relates to a field of an image processing method, an image processing device, and a computer device.

Liquid crystal display technology has a wide range of applications, involving smart homes, commercial displays, and e-sports entertainment, with the development of liquid crystal display technology, the picture display quality are becoming more demanding. Therefore, it is particularly important to improve the liquid crystal display technology. In terms of image display, there are obvious differences between a hue and a saturation of certain colors and a real image, which will affect the quality of the image display, and even cause a distortion of the image.

Regarding the image processing technologies to improve color cast, one of the image processing technologies commonly used is a view angle compensation (VAC) technology for liquid crystal displays. This technology can correct a gamma curve under a side viewing angle and solve a problem of large perspective color cast.

The VAC algorithm can have a variety of driving modes. Regarding two common driving modes at present, one of the driving modes has better picture quality display effect and small grid feeling, but the effect of improving the color cast phenomenon is worse; the other driving mode has good improvement effect on color cast, but has large grid feeling, causes the image display quality needs to be further improved.

SUMMARY OF THE INVENTION

The present application provides an image processing method, an image processing device, and a computer device to relieve a technical problem in the prior arts that a grid feeling and a color cast cannot be optimized at the same time.

In a first aspect, the present application provides an image processing method, including:
acquiring a first to-be-processed chromaticity data set and a second to-be-processed chromaticity data set of a preset color of a to-be-processed picture;
acquiring a Gaussian probability of the preset color of a preset scene according to the first to-be-processed chromaticity data set and the second to-be-processed chromaticity data set;
identifying a picture region in the to-be-processed picture that contains the preset color of the preset scene; and
acquiring a color output correction value of the preset color of the preset scene of the picture region according to the Gaussian probability to perform a compensation processing on the preset color of the preset scene of the to-be-processed picture.

Further, the image processing method further includes acquiring a brightness data of the preset color of the to-be-processed picture;
determining a brightness interval of the brightness data;
retrieving a linear adjustment model of the brightness interval;
acquiring a brightness adjustment probability of a brightness of the to-be-processed picture according to the linear adjustment model and the brightness data; and
acquiring the color output correction value of the preset color of the preset scene of the picture region according to the brightness adjustment probability and the Gaussian probability to perform the compensation processing on the preset color of the preset scene of the to-be-processed picture.

Further, before the step of acquiring the Gaussian probability of the preset color of the preset scene according to the first to-be-processed chromaticity data set and the second to-be-processed chromaticity data set, the method further includes:
acquiring a first initial chromaticity data set and a second initial chromaticity data set of a preset color of a preset scene of a preprocessed picture; and
establishing a Gaussian model of the preset color according to the first initial chromaticity data set and the second initial chromaticity data set; and
wherein the step of acquiring the Gaussian probability of the preset color of the preset scene according to the first to-be-processed chromaticity data set and the second to-be-processed chromaticity data set includes:
acquiring the Gaussian probability of the preset color of the preset scene by the Gaussian model according to the first to-be-processed chromaticity data set and the second to-be-processed chromaticity data set.

Further, the step of acquiring the first initial chromaticity data set and the second initial chromaticity data set of the preset color of the preset scene of the preprocessed picture includes:
acquiring a plurality of preprocessed pictures containing the preset scene; and
extracting color data of the preset color of the preset scene in any of the preprocessed pictures, and acquiring the first initial chromaticity data set and the second initial chromaticity data set.

Further, the step of establishing a Gaussian model of the preset color according to the first initial chromaticity data set and the second initial chromaticity data set includes:
acquiring mean values of the first initial chromaticity data set and the second initial chromaticity data set respectively;
acquiring a covariance matrix regarding the first initial chromaticity data and the second initial chromaticity data, an inverse of the covariance matrix, and a rank of covariance matrix; and
establishing the Gaussian model according to the covariance matrix, the inverse of the covariance matrix, and the rank of the covariance matrix.

Further, the preset scene includes one or more of portraits, blue sky, grass, food, animals, and buildings.

Further, the step of acquiring the first initial chromaticity data set and the second initial chromaticity data set of the preset color of the preset scene of the preprocessed picture includes:
  acquiring a plurality of first preprocessed pictures containing preset scene of portraits;
  extracting data of skin color of the plurality of first preprocessed pictures; and
  decomposing the skin color data to obtain a first initial chromaticity data set and a second initial chromaticity data set of the skin color data.

Further, the step of acquiring the first to-be-processed chromaticity data set and the second to-be-processed chromaticity data set of the preset color of the to-be-processed picture includes:
  extracting data of the preset color of the to-be-processed picture;
  decomposing the data of the preset color; and
  acquiring the first to-be-processed chromaticity data set and the second to-be-processed chromaticity data set of the preset color.

Further, the step of acquiring the Gaussian probability of the preset color of the preset scene includes:
  determining whether the to-be-processed picture contains the preset scene;
  assigning a value to a correlation coefficient of the preset scene of the to-be-processed picture according to a result of determining whether the to-be-processed picture contains the preset scene;
  acquiring the initial probability of the preset color according to the Gaussian model of any one of the preset colors of the to-be-processed picture; and
  acquiring the Gaussian probability of the preset scene of the to-be-processed picture according to the initial probability and the correlation coefficient.

Further, there are a plurality of preset scenes and a plurality of preset colors; and
  after the initial probability of any one of the plurality of the preset scenes is corrected by the correlation coefficient, the method includes:
  calculating a sum of the initial probabilities corrected by the correlation coefficient of the plurality of preset scenes of the to-be-processed picture and acquiring the Gaussian probabilities of the plurality of preset scenes of the to-be-processed picture.

Further, the step of acquiring the Gaussian probability of the preset color of the preset scene further includes:
  determining whether the to-be-processed picture contains the preset scene; and
  If the preset scene does not exist in the to-be-processed picture, the correlation coefficient of the preset scene of the to-be-processed picture is assigned a value of 0.

Further, the step of identifying a picture region in the to-be-processed picture that contains the preset color of the preset scene includes:
  dividing the to-be-processed picture into a plurality of the picture regions;
  obtaining a pixel gradient of any of the picture regions;
  counting a number of pixels with a pixel gradient greater than a first preset threshold in any one of the picture regions;
  determining whether the number of pixels is greater than a second preset threshold; and
  if the number of pixels is greater than the second preset threshold, the picture region is determined to be the picture region containing the preset color of the preset scene.

Further, the step of obtaining the pixel gradient of any of the picture regions includes:
  extracting pixel values of any of the picture regions; and
  calculate the pixel gradient of the picture region according to the pixel values.

Further, the step of acquiring the color output correction value of the preset color of the preset scene of the picture region according to the Gaussian probability includes:
  acquiring a first texture probability of the picture region if the number of pixels is greater than the second preset threshold;
  acquiring a second texture probability of the picture region if the number of pixels is less than the second preset threshold; and
  for any one of the picture regions, acquiring a product of the Gaussian probability of the preset color of the picture region with respect to the preset scene and the first texture probability or the second texture probability to acquire the color output correction value of the preset color of the preset scene of the picture region.

Further, the step of acquiring the color output correction value of the preset color of the preset scene of the picture region according to the Gaussian probability includes:
  acquiring a first texture probability of the picture region that contains the preset color of the preset scene;
  acquiring a product of the first texture probability and the Gaussian probability of the picture region containing the preset scene to acquire the color output correction value of the preset color of the preset scene of the picture region.

Further, the step of identifying the picture region in the to-be-processed picture that contains the preset color of the preset scene includes:
  acquiring brightness data of the to-be-processed picture;
  dividing brightness of the preset color of the preset scene into a plurality of brightness intervals according to the brightness data; and
  performing a correcting adjustment or a suppressing adjustment on the brightness data of the preset color in the brightness interval to obtain the brightness adjustment probability.

In a second aspect, embodiments of the present application provide an image processing device, including:
  a data acquisition unit configured to acquire a first to-be-processed chromaticity data set and a second to-be-processed chromaticity data set regarding preset colors of a to-be-processed picture;
  a first data processing unit configured to acquire a Gaussian probability of the preset color of the preset scene from a constructed Gaussian model according to the first to-be-processed chromaticity data set and the second to-be-processed chromaticity data set;
  a texture identification unit configured to identify a picture region containing the preset scene in the to-be-processed picture; and
  a second data processing unit configured to acquire a color output correction value of the preset color of the preset scene of the picture region according to the Gaussian probability to perform a compensation processing on the preset color of the preset scene of the to-be-processed picture.

Further, the image processing device further includes a brightness adjustment unit configured to acquire brightness data of the preset color in the to-be-processed picture.

In a third aspect, embodiments of the present application provide a computer device, including, one or more processors;
a memory; and
one or more application programs, wherein the one or more application programs are stored in the memory and configured to be executed by the processor to implement the image processing method.

Further, the computer device further includes a power source and an input unit, and wherein the power source is logically connected to the processor by a power management system.

The image processing method, image processing device, and computer device of the present application are corrected by a correlation coefficient of a corresponding preset scene according to whether the picture to-be-processed contains a preset scene, and adjust a Gaussian probability of a preset color of the preset scene acquired according to the Gaussian model. By a corresponding compensation processing technology, such as a use of viewing angle compensation processing, a display transition of the preset color in line with the human visual characteristics, and a display transition of the preset color is natural when the picture displayed, can effectively improve a color cast phenomenon and a processing efficiency of an picture to-be-processed, to improve an accuracy of color detection to prevent colors in other scenes that are similar to the preset colors of the preset scene from misdetection. At the same time, since only the preset colors of the preset scene in the picture to-be-processed are processed, when the picture is output, it can also effectively reduce a grid feeling and improve a picture quality.

BRIEF DESCRIPTION OF THE SEVERAL VIEWS OF THE DRAWINGS

In order to explain the technical solutions in the embodiments of the present application more clearly, the following will briefly introduce the figures used in the description of the embodiments. Obviously, the figures in the following description are only some embodiments of the present application. For those skilled in the art, without inventive steps, other figures can be obtained based on these figures.

DESCRIPTION OF SPECIFIC EMBODIMENTS OF THE INVENTION

The technical solutions in the embodiments of the present application will be clearly and completely described below in conjunction with the accompanying figures in the embodiments of the present application. Obviously, the described embodiments are only a part of the embodiments of the present application, rather than all the embodiments. Based on the embodiments of the present application, all other embodiments obtained by those skilled in the art without inventive steps shall fall within the protection scope of the present application.

In the description of the present application, it should be understood that the terms such as center, longitudinal, transverse, length, width, thickness, upper, lower, front, rear, left, right, vertical, horizontal, top, bottom, inner, and outer which are orientations or positional relationships indicated by the orientation or the positional relationship shown in the figures, which is only for the convenience of describing the present application and simplifying the description, rather than indicating or implying that the device or element must have a specific orientation, be constructed and operated in a specific orientation, and therefore cannot be understood as a limitation of the present application. In addition, the terms first and second are only used for descriptive purposes, and cannot be understood as indicating or implying relative importance or implicitly indicating the number of indicated technical features. Therefore, the features defined with first and second may explicitly or implicitly include one or more features. In the description of the present application, plurality means two or more, unless otherwise specifically defined.

In the present application, the word exemplary is used to mean serving as an example, embodiment, or illustration. Any embodiment described as exemplary in the present application is not necessarily construed as being more preferable or advantageous than other embodiments. In order to enable any person skilled in the art to implement and use the present application, the following description is provided. In the following description, the details are listed for the purpose of explanation. It should be understood that those of ordinary skill in the art can realize that the present application can also be implemented without using these specific details. In other instances, well-known structures and processes will not be elaborated to avoid unnecessary details to obscure the description of the present application. Therefore, the present application is not intended to be limited to the illustrated embodiments, but is consistent with the widest scope that conforms to the principles and features disclosed in the present application. Unless otherwise specified, the orientation of parallel or perpendicular in the present application is not strictly parallel or perpendicular, as long as the corresponding structure can achieve the corresponding purpose.

Figure 1:
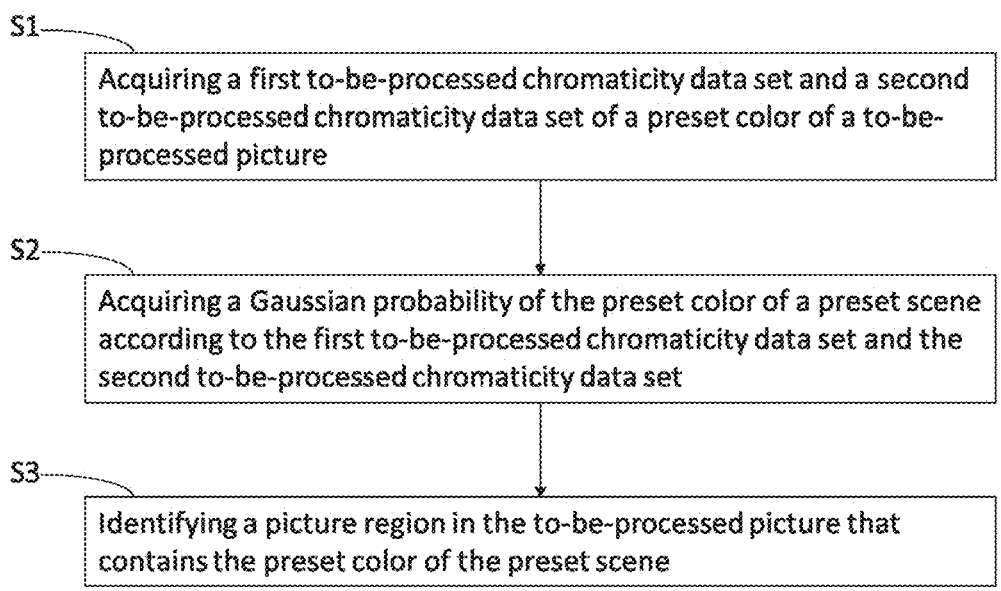
FIG. 1 is a schematic diagram of an image processing method provided in one embodiment of the present application.

Referring to FIG. 1, one embodiment of the present application provides an image processing method, and the image processing method includes:
Step S1: Acquiring a first to-be-processed chromaticity data set and a second to-be-processed chromaticity data set of a preset color of a to-be-processed picture;
Step S2: Acquiring a Gaussian probability of the preset color of a preset scene according to the first to-be-processed chromaticity data set and the second to-be-processed chromaticity data set;
Step S3: Identifying a picture region in the to-be-processed picture that contains the preset color of the preset scene;
According to the Gaussian probability, a color output correction value of the preset color of the preset scene in the picture region is acquired to perform compensation processing on the preset color of the preset scene of the to-be-processed picture.

Specifically, in one embodiment of the present application, the constructed Gaussian model processes the relevant data in the to-be-processed picture to obtain the Gaussian probability of the preset color of the preset scene in the to-be-processed picture. When constructing the Gaussian model, a plurality of preprocessed pictures can be selected from the relevant database, and these preprocessed pictures respectively contain corresponding preset scenes. The type and number of preset scenes can be specifically set according to actual needs. In the image processing method in the embodiment of the present application, when constructing a Gaussian model, the preset scenes can be portraits, blue sky, grass, food, animals, buildings, and other natural scenery. For various scenes such as objects, the corresponding preset color is the corresponding color in each scene. For example, in a portrait scene, the preset color may be skin tone; in a blue sky scene, the preset color may be blue; in a grass scene, the preset color may be green.

In one embodiment of the present application, when constructing the Gaussian model, the human eye sensitive color and the corresponding scene are selected as an example for description. In the embodiment of the present application, three preset scenes of portrait, blue sky, and grass are selected, and the corresponding preset colors are skin color, blue, and green respectively. The following are examples of the above three preset scenes and the corresponding preset colors.

A plurality of first preprocessed pictures containing preset scenes of portraits, a plurality of second preprocessed pictures containing preset scenes of blue sky, and a plurality of third preprocessed pictures containing preset scenes of grass are respectively selected from the database. A number of preprocessed pictures containing each preset scene is specifically set according to actual conditions.

For any first preprocessed picture, the skin color data of the first preprocessed picture is extracted, and the specific extraction method can be a current conventional extraction method. After acquiring the skin color data of the first preprocessed picture, the skin color data can be decomposed in a Ycbcr space to obtain a brightness data of the skin color data, a first initial chromaticity data, and a second initial chromaticity data respectively.

Then, for the skin color data of the plurality of first preprocessed pictures, the brightness data set, the first initial chromaticity data set, and the second initial chromaticity data set of the skin color data can be acquired. The decomposition processing of skin color data can be processed in the Ycbcr space or a HSB color space, etc. Similarly, the following method of decomposing the preset colors of other preset scenes can be processed in Ycbcr space, or can also be processed in other color spaces. The following will take the processing in the Ycbcr space as an example for description.

Specifically, the skin color data of the first preprocessed picture may be specifically processed using the following formula:

$$y_{skin(i)} = (R*0.2567 + G*0.5041 + B*0.0979) + 16 \quad (1)$$

$$cb_{skin(i)} = (R*0.1482 + G*0.2909 + B*0.4391) + 128 \quad (2)$$

$$cr_{skin(i)} = (R*0.4392 + G*0.3678 + B*0.0714) + 128 \quad (3)$$

R, G, and B in the above formula are the red component value, green component value, and blue component value of the skin color data respectively, $y_{skin\,(i)}$ is a brightness data of the skin color data, $cb_{skin\,(i)}$ is a first initial chromaticity data of the skin color data, and $cr_{skin\,(i)}$ is a second initial chromaticity data of the skin color data.

Performing the same processing on the plurality of first preprocessed pictures respectively to acquire a plurality of luminance brightness data $y_{skin\,(i)}$ to form a brightness data set, acquire a plurality of first initial chromaticity data $cb_{skin\,(i)}$ to form a first initial chromaticity data set $cb_{skin\,(1)}$, $cb_{skin\,(2)} \ldots cb_{skin\,(i)}$, and acquire a plurality of second initial chromaticity data $cr_{skin}$ to form a second initial chromaticity data set $cr_{skin\,(1)}$, $cr_{skin\,(2)} \ldots cr_{skin\,(i)} \ldots$.

Acquiring a mean value of the first initial chromaticity data set to acquire a first chromaticity mean value $\mu_{skin1}$ of the skin color data, and acquires a variance $a_{skin}$ between each first initial chromaticity data in the first initial chromaticity data set and the first chromaticity mean value acquiring a mean value of the second initial chromaticity data set to acquire a second chromaticity mean value $\mu_{skin2}$ of the skin color data, and acquiring a variance $d_{skin}$ between each second initial chromaticity data in the second initial chromaticity data set and the second chromaticity mean value $\mu_{skin2}$.

Acquiring a covariance matrix of the first initial chromaticity data and the second initial chromaticity data of the skin color in the portrait scene cov $(cb_{skin}, cr_{skin})$ from the variance $a_{skin}$, $d_{skin}$, the first initial chromaticity data set $cr_{skin\,(1)}$, $cr_{skin\,(2)} \ldots cr_{skin\,(i)}$, the second initial chromaticity data set $cr_{skin\,(1)}$, $cr_{skin\,(2)} \ldots cr_{skin\,(i)}$, the specific expression is as follows:

$$\text{cov}(cb_{skin}, cr_{skin}) = \begin{bmatrix} a_{skin} & b_{skin} \\ c_{skin} & d_{skin} \end{bmatrix} = E[(cb_{skin(i)} - \mu_{skin1})(cr_{skin(i)}\mu_{skin2})] \quad (4)$$

$cr_{skin\,(i)}$ is the first initial chromaticity data of any first preprocessed picture, $cr_{skin\,(i)}$ is the second initial chromaticity data of any first preprocessed picture, $\mu_{skin1}$ is the first chromaticity mean value of the skin color data of the plurality of first preprocessed pictures, $\mu_{skin2}$ is the second chromaticity mean value of the skin color data of the plurality of first preprocessed pictures, $a_{skin}$ is a variance matrix between the first initial chromaticity data of the skin color data of the first preprocessed picture and the first chromaticity mean value $\mu_{skin1}$, $d_{skin}$ is a variance matrix between the second initial chromaticity data of the skin color data of the first preprocessed picture and the second chromaticity mean value $\mu_{skin2}$, wherein $b_{skin}$ and $c_{skin}$ are the correlations between the first initial chromaticity data set and the second initial chromaticity data set of the skin color of the first preprocessed picture.

From the above formula (4), an inverse matrix $\text{cov}^{-1}$ $(cb_{skin}, cr_{skin})$ or $\Sigma_{skin}^{-1}$ of coy $(cb_{skin}, cr_{skin}$ and a rank $|\Sigma_{skin}|$ of cov $(cb_{skin}, cr_{skin})$ can be acquired. From the above parameters, a Gaussian model of skin color in a portrait scene can be constructed, which can be specifically expressed as follows:

$$gauss_{skin}(cb_i, cr_i) = \qquad (5)$$
$$A * \frac{1}{(2\pi)^{d_{skin}/2}|\Sigma_{skin}|^{1/2}} \exp\left[-\frac{1}{2}((cb_i, cr_i) - \overline{\mu}_{skin})^T \Sigma_{skin}^{-1}((cb_i, cr_i) - \overline{\mu}_{skin})\right]$$

A is an amplitude of the Gaussian model in a value range of [0, 1], $gauss_{skin}(cb_i, cr_i)$ is an initial probability of the skin color acquired by the Gaussian model in the portrait scene, $a_{skin}$ is the variance matrix between the first initial chromaticity data of the skin color data of the first preprocessed picture and the first chromaticity mean value $\mu_{skin1}$, $d_{skin}$ is the variance matrix between the second initial chromaticity data of the skin color data of the first preprocessed picture and the second chromaticity mean value $\mu_{skin2}$, $cb_i$ is a first chromaticity variable for skin color, $cr_i$ is a second chromaticity variable for skin color, $\Sigma_{skin}^{-1}$ is an inverse matrix of cov ($cb_{skin}$, $cr_{skin}$), $|\Sigma_{skin}|$ is a rank of cov ($cb_{skin}$, $cr_{skin}$), and $\bar{\mu}_{skin}$ is a mean value of the first initial chromaticity data set and the second initial chromaticity data set of the skin color of the first preprocessed picture.

Similarly, for any second preprocessed picture, the blue data of the second preprocessed picture is extracted. After acquiring the blue data of the second preprocessed picture, the blue data can be decomposed in the Ycbcr space to obtain a brightness data, a first initial chromaticity data, and a second initial chromaticity data of the blue data, respectively. Then, for the blue data of the plurality of second preprocessed pictures, the brightness data set, the first initial chromaticity data set, and the second initial chromaticity data set of the blue data can be acquired.

Specifically, the blue data of the second preprocessed picture can be processed by using the following formula:

$$y_{sky(i)} = (R*0.2567 + G*0.5041 + B*0.0979) + 16 \quad (6)$$

$$cb_{sky(i)} = (R*0.1482 + G*0.2909 + B*0.4391) + 128 \quad (7)$$

$$cr_{sky(i)} = (R*0.4392 + G*0.3678 + B*0.0714) + 128 \quad (8)$$

R, G, B in the above formula are the red component value, the green component value, and the blue component value of the blue data respectively, $y_{sky\,(i)}$ is a brightness data of the blue data, $cb_{sky\,(i)}$ is a first initial chromaticity data of the blue data, and $cr_{sky\,(i)}$ is a second initial chromaticity data of blue data.

A covariance matrix cov ($cb_{sky}$, $cr_{sky}$)) of the first initial chromaticity data and the second initial chromaticity data of the blue color in the blue sky scene can be acquired from the above-mentioned data of the second preprocessed picture, and the specific expression is as follows:

$$\operatorname{cov}(cb_{sky}, cr_{sky}) = \begin{bmatrix} a_{sky} & b_{sky} \\ c_{sky} & d_{sky} \end{bmatrix} = E[(cb_{sky(i)} - \mu_{sky1})(cr_{sky(i)} - \mu_{sky2})] \quad (9)$$

$$gauss_{sky}(cb_i, cr_i) = \\ A * \frac{1}{(2\pi)^{d_{skin}/2}|\Sigma_{sky}|^{1/2}} \exp\left[-\frac{1}{2}((cb_i, cr_i) - \bar{\mu}_{sky})^T \Sigma_{sky}^{-1}((cb_i, cr_i) - \bar{\mu}_{sky})\right] \quad (10)$$

In the above formulas (9) and (10), $cb_{sky\,(i)}$ is a first initial chromaticity data of any second preprocessed picture, $cr_{sky\,(i)}$ is a second initial chromaticity data of any second preprocessed picture, $\mu_{sky1}$ is a first chromaticity mean value of the blue data of the plurality of second preprocessed pictures, $\mu_{sky2}$ is a second chromaticity mean value of the blue data of the plurality of second preprocessed pictures, $\alpha_{sky}$ is a variance matrix between the first initial chromaticity data of the blue data of the second preprocessed picture and the first chromaticity mean value $\mu_{sky1}$, $d_{sky}$ is a variance matrix between the second initial chromaticity data of the blue data of the second preprocessed picture and the second chromaticity mean value $\mu_{sky2}$, $b_{sky}$ and $c_{sky}$ are correlations between the first initial chromaticity data set and the second initial chromaticity data set; A is an amplitude of the Gaussian model which has a value range of [0, 1], $gauss_{sky}$ (cbi,cri) is an initial probability of the blue color acquired by the Gaussian model in the blue sky scene, $cb_i$ is a first chromaticity variable of a second chromaticity variable of blue color, $cr_i$ is a second chromaticity variable of a second chromaticity variable of blue color, $\Sigma_{sky^{-1}}$ is an inverse matrix of cov ($cb_{sky}$,$cr_{sky}$), $|\Sigma_{sky}|$ is a rank of cov ($cb_{sky}$, $cr_{sky}$), and $\mu_{sky}$ is a mean value the first initial chromaticity data set and the second initial chromaticity data set of blue color of the second preset picture.

For any third preprocessed picture, extract the green data of the third preprocessed picture. After the green data of the third preprocessed picture is acquired, the green data can be decomposed in the Ycbcr space to obtain a brightness data, a first initial chromaticity data, and a second initial chromaticity data of the green data, respectively. Then, for the green data of the plurality of third preprocessed pictures, the brightness data set, the first initial chromaticity data set, and the second initial chromaticity data set of the green data can be acquired.

Specifically, the green data of the third preprocessed picture can be specifically processed using the following formula:

$$y_{grass(i)} = (R*0.2567 + G*0.5041 + B*0.0979) + 16 \quad (11)$$

$$cb_{grass(i)} = (R*0.1482 + G*0.2909 + B*0.4391) + 128 \quad (12)$$

$$cr_{grass(i)} = (R*0.4392 + G*0.3678 + B*0.0714) + 128 \quad (13)$$

R, G, and B in the above formula are the red component value, green component value, and blue component value of the green data respectively, $y_{grass\,(i)}$ is the brightness data of the green data, $cb_{grass\,(i)}$ is the first initial chromaticity data of the green data, and $cr_{grass\,(i)}$ is the second initial chromaticity data of the green data.

The covariance matrix cov ($cb_{sky}$, $cr_{sky}$) of the first initial chromaticity data and the second initial chromaticity data of the blue color in the blue sky scene can be acquired to from the above-mentioned data of the second preprocessed picture, and the specific expression is as follows:

$$\operatorname{cov}(cb_{grass}, cr_{grass}) = \begin{bmatrix} a_{grass} & b_{grass} \\ c_{grass} & d_{grass} \end{bmatrix} = \\ E[(cb_{grass(i)} - \mu_{grass1})(cr_{grass(i)} - \mu_{grass2})] \quad (14)$$

$$gauss_{grass}(cb_i, cr_i) = A * \frac{1}{(2\pi)^{d_{grass}/2}|\Sigma_{grass}|^{1/2}} \\ \exp\left[-\frac{1}{2}((cb_i, cr_i) - \bar{\mu}_{grass})^T \Sigma_{grass}^{-1}((cb_i, cr_i) - \bar{\mu}_{grass})\right] \quad (15)$$

In the above formulas (14) and (15), $cb_{grass\,(i)}$ is the first initial chromaticity data of any third preprocessed picture, $cr_{grass\,(i)}$ is the second initial chromaticity data of any third preprocessed picture, $\mu_{grass1}$ is the first chromaticity mean value of the green data of the plurality of third preprocessed pictures, $\mu_{grass2}$ is the second chromaticity mean value of the green data of the plurality of third preprocessed pictures, $\alpha_{grass}$ is a variance matrix between the first initial chromaticity data of the green data of the third preprocessed picture and the first chromaticity mean value $\mu_{grass1}$, $d_{grass}$ is a variance matrix between the second initial chromaticity data of the green data of the third preprocessed picture and the second chromaticity mean value $\mu_{grass2}$, $b_{grass}$ and $c_{grass}$ are correlations between the first initial chromaticity data set and the second initial chromaticity data set, A is an amplitude of the Gaussian model having a value range [0, 1], $gauss_{grass}$ ($cb_i$,$cr_i$) is an initial probability of the green color obtained by the Gaussian model in the grass scene, $cb_i$ is a first chromaticity variable for green color, $cr_i$ is a second chromaticity variable for green color, $\Sigma_{grass}{-1}$ is an inverse matrix of cov ($cb_{grass}$,$cr_{grass}$) $|\Sigma_{grass}|$ is a rank of cov ($cb_{grass}$,$cr_{grass}$), and $\bar{\mu}_{grass}$ is a mean value of the first initial chromaticity data set and the second initial chromaticity data set of the green color of the third preset picture.

By using the above method to construct a Gaussian model, the type and number of preset scenes can be set according to the needs, and the type and number of preset colors can be set accordingly, and the Gaussian models of each preset color of each preset scene can be established separately and flexibly adjusted according to different application scenarios, different customer needs, or different image quality requirements. In addition, parameters such as the amplitude in the Gaussian model, the mean value of the preset colors in the preprocessed picture, and the correlation covariance matrix can be adjusted according to requirements, and can also be adjusted according to accuracy or other considerations, which has strong practicability and versatility.

Specifically, when the to-be-processed picture is processed, the data of the preset color of the to-be-processed picture is first extracted. For example, when processing portraits, blue sky, and grass scenes in the to-be-processed picture, extract the color data of skin color, blue, and grass in the to-be-processed picture, and perform decomposition processing in the Ycbcr space to obtain the first to-be-processed chromaticity data set and the second to-be-processed chromaticity data set regarding the skin color, the first to-be-processed chromaticity data set and the second to-be-processed chromaticity data set regarding the blue color, and the first to-be-processed chromaticity data set and the second to-be-processed chromaticity data set regarding the green color.

After acquiring the first to-be-processed chromaticity data set and the second to-be-processed chromaticity data set of each preset color, the first to-be-processed chromaticity data set and the second to-be-processed chromaticity data set of each preset color can be substituted into the Gaussian model of the corresponding preset color to acquire an initial probability map of the preset color.

For example, substituting each chromaticity data in the first to-be-processed chromaticity data set and the second to-be-processed chromaticity data set of skin color into the above formula (5) correspondingly, an initial probability map of skin color in the to-be-processed picture can be obtained. Similarly, substituting each chromaticity data in the first to-be-processed chromaticity data set and the second to-be-processed chromaticity data set of blue color into the above formula (10) correspondingly, an initial probability map of the blue color in the to-be-processed picture can be obtained.

Substituting each chromaticity data in the first to-be-processed chromaticity data set and the second to-be-processed chromaticity data set of green color into the above formula (15) correspondingly, an initial probability map of the green color in the to-be-processed picture can be obtained.

Specifically, when the to-be-processed picture is processed, it can be determined whether the to-be-processed picture contains a preset scene, and a correlation coefficient of the preset scene can be assigned according to the determined result. The correlation coefficient of the corresponding preset scene is corrected according to the result of whether the to-be-processed picture contains the preset scene, and the Gaussian probability of the preset color of the preset scene acquired according to the Gaussian model is adjusted, to improve a processing efficiency of the to-be-processed picture, and improve an accuracy of color detection to prevent colors in other scenes which is similar to the preset colors of the preset scene from misdetection. At the same time, since only the preset colors of the preset scene in the to-be-processed picture are processed, when the picture is output, it can further effectively reduce a grid feeling and improve a quality of the picture. The method of determining whether the to-be-processed picture contains the preset scene can be processed in a current conventional manner.

Specifically, when a plurality of preset scenes and corresponding preset colors are set, a comprehensive Gaussian probability value of the preset colors of the plurality of preset scenes can be adjusted by a sum of initial probabilities of the correlation coefficient of each preset scene, which can be acquired by the following formula:

$$\text{gauss}(cb,cr) = \alpha * \text{gauss}_{skin}(cb_i, cr_i) + \beta * \text{gauss}_{sky}(cb_i, cr_i) + \gamma * \text{gauss}_{grass}(cb_i, cr_i) \quad (16)$$

In the formula, gauss(cb, cr) are Gaussian probabilities of the preset color of the preset scene in the to-be-processed picture, $\alpha$ is a correlation coefficient of the portrait scene in the to-be-processed picture, and $\text{gauss}_{skin}(cb_i, cr_i)$ are initial probabilities of the skin color acquired by the Gaussian model, $\beta$ is a correlation coefficient of the blue sky scene in the to-be-processed, $\text{gauss}_{sky}(cb_i, cr_i)$ are the initial probabilities of the blue color acquired by the Gaussian model, and y is a correlation coefficient of the grass scene in the to-be-processed picture, $\text{gauss}_{grass}(cb_i, cr_i)$ are initial probabilities of the green color acquired by the Gaussian model.

When there is no corresponding preset scene in the to-be-processed picture, the corresponding correlation coefficient can be assigned a value of 0, and a product of it and the initial probability of the preset color of the preset scene acquired by the Gaussian model fitting is 0, to prevent similar colors in the to-be-processed picture from misdetection.

For example, when the to-be-processed picture contains a portrait scene, the correlation coefficient $\alpha$ for the portrait scene is assigned a value of 1; when there is no portrait scene in the to-be-processed picture, the correlation coefficient $\alpha$ for the portrait scene is assigned a value of 0. Similarly, when the to-be-processed picture contains a blue sky scene, the correlation coefficient $\beta$ of the blue sky scene is assigned a value of 1; when there is no blue sky scene in the to-be-processed picture, the correlation coefficient $\beta$ of the blue sky scene is assigned a value of 0. When the to-be-processed picture contains a grass scene, the correlation coefficient $\gamma$ of the grass scene is assigned a value of 1; when there is no grass scene in the to-be-processed picture, the correlation coefficient $\gamma$ of the grass scene is assigned a value of 0.

Figure 2:
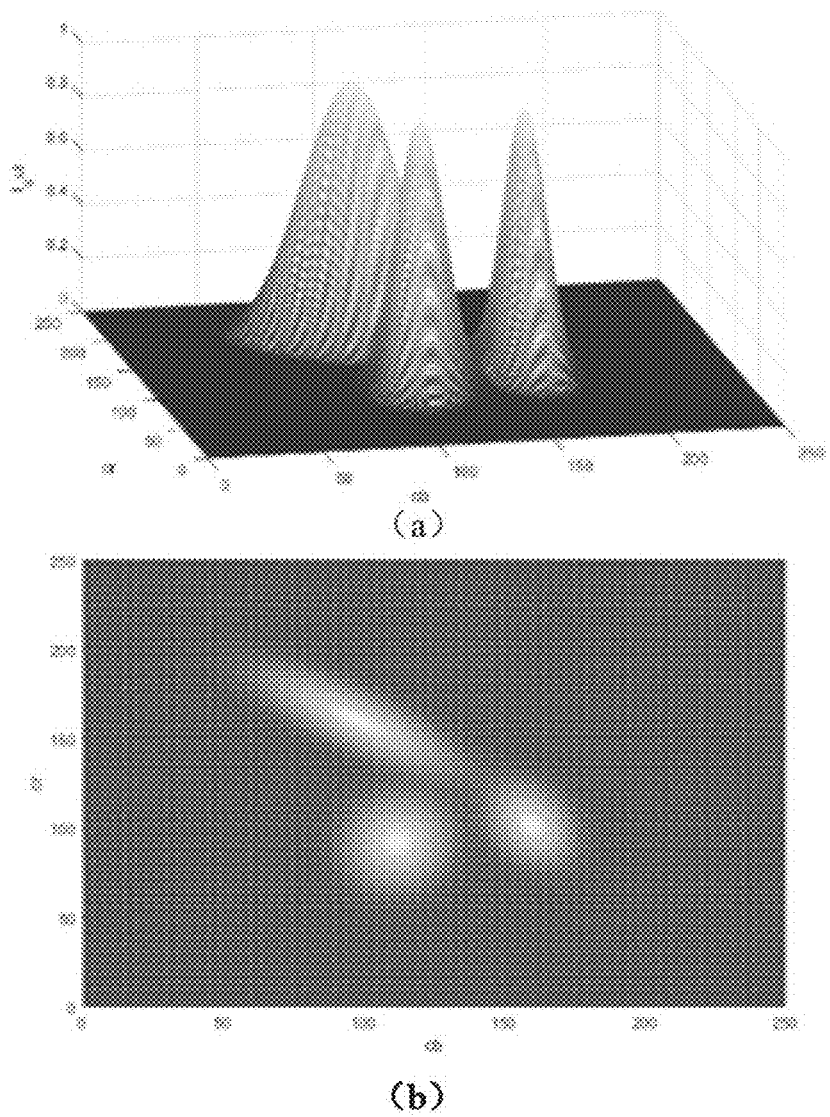
FIG. 2 is a Gaussian model simulation effect diagram of the image processing method provided in one embodiment of the present application.

For example, when the to-be-processed picture contains a portrait scene but no blue sky scene or grass scene, the color data of the to-be-processed picture is fitted by a Gaussian model and corrected by the corresponding preset scene correlation coefficient. The resulting Gaussian probability is $\text{gauss}(cb, cr) = \text{gauss}_{skin}(cb_i, cr_i)$, for the blue sky scene and the grass scene, the Gaussian fitting probability is 0. When the to-be-processed picture contains portrait scenes, blue sky scenes, and no grass scenes, the color data of the to-be-processed picture is fitted by the Gaussian model and corrected by the corresponding preset scene correlation coefficient, the resulting Gaussian probability is $\text{gauss}(cb, cr) = \text{gauss}_{skin}(cb_i, cr_i) + \text{gauss}_{sky}(cb_i, cr_i)$. When the to-be-processed picture contains the portrait scene, the blue sky scene, and the grass scene at the same time, the color data of the to-be-processed picture is fitted by a Gaussian model and corrected by the corresponding preset scene correlation coefficient. The resulting Gaussian probability is $\text{gauss}(cb, cr) = \text{gauss}_{skin}(cb_i, cr_i) + \text{gauss}_{sky}(cb_i, cr_i) + \text{gauss}_{grass}(cb_i, cr_i)$, refer to (a) and (b) of FIG. 2, which are a front-view and a top-view of the Gaussian fitting model data simulation diagram respectively.

Figure 3:
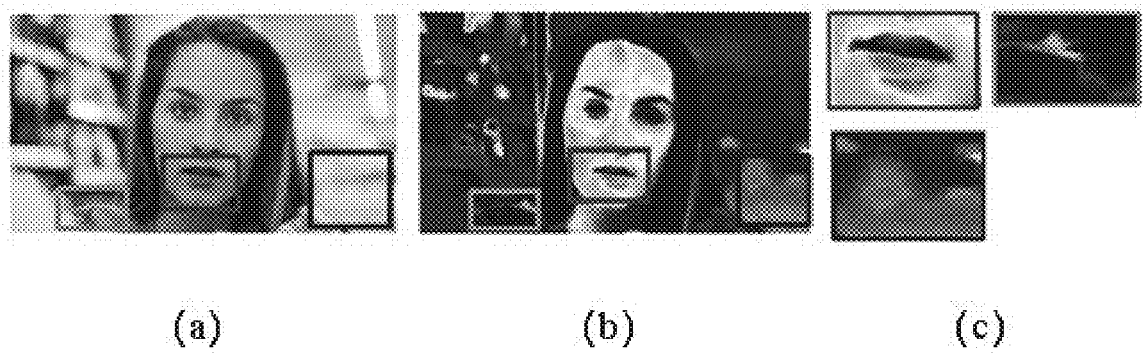
FIG. 3 is a probability effect diagram of skin color processing of a portrait scene in an image processing method provided in one embodiment of the present application.

Generally, in addition to portrait scenes, blue sky scenes, and/or grass scenes in the to-be-processed picture, there are usually other scenes in the to-be-processed picture, such as an item cabinet behind the portrait in FIG. 3 (a). When processing the to-be-processed picture, the picture region containing the preset color of the preset scene in the to-be-processed picture can also be identified to more accurately simulate the preset color of the preset scene in the to-be-processed picture. After identifying the portion of the picture region, applying the Gaussian probability obtained by the Gaussian model, it is possible to obtain the color output correction value for the preset color of the preset scene in the to-be-processed picture. The color output correction value is applied to the viewing angle compensation technology, which can effectively improve the color cast phenomenon of the preset color of the preset scene in the output picture. In addition, the color data after the Gaussian model fitting process has natural color transitions, small lattice, higher picture quality in line with human visual characteristics, and provides better viewing experience.

Specifically, when identifying the picture region of the preset scene in the to-be-processed picture, the to-be-processed picture can be divided into a plurality of picture regions. The size of the picture region can be adjusted according to actual conditions or needs. For example, the to-be-processed picture can be divided into regions of 10*10 size.

For any picture region, extract the pixel value in the picture region to obtain the pixel gradient in the picture region. For example, current conventional algorithms such as the sobel operator can be used to calculate the pixel gradient T of the picture region. A first preset threshold $T_{thresh}$ is set, and the pixel gradient value of each pixel is compared with the first preset threshold $T_{thresh}$. For the pixel gradient value higher than the first preset threshold $T_{thresh}$, the pixels corresponding to the pixel gradient value are counted.

Counting a number I of pixels in the picture region whose pixel gradient is higher than the first preset threshold $T_{thresh}$, and compare the number I of pixels in the picture region whose pixel gradient value is higher than the first preset threshold $T_{thresh}$ with the second preset threshold $L_{thresh}$. If the number I of pixels in the picture region whose pixel gradient value is higher than the first preset threshold $T_{thresh}$ is greater than the second preset threshold $T_{thresh}$, it is determined that the picture region is a fine texture area, and the picture region contains the preset color of the preset scene. The first preset threshold $T_{thresh}$ and the second preset threshold $T_{thresh}$ can be specifically set according to actual conditions or requirements.

Specifically, when the preset color of the preset scene is more accurately recognized, assigning values to the picture region that contains the preset color of the preset scene and the picture region that does not contain the preset color of the preset scene respectively, a first texture probability P1 of the picture region containing the preset color of the preset scene is assigned a value of 1, and a second texture probability P2 of the picture region that does not contain the preset color of the preset scene is assigned a value of 0. According to the above method, recognize each picture region of the to-be-processed picture, and assign values according to the recognition situation After identifying the picture region with the preset color of the preset scene in the to-be-processed picture, as one of the ways to acquire the color output correction value, for any picture region, acquire the color output correction value of the picture region with respect to the preset color of the preset scene according to a product of the Gaussian probability and the texture probability corresponding to the picture region. Then when the picture region contains the preset color of the preset scene, the color output correction value of the corresponding color of the picture region is not 0, and the color output correction value is used for the viewing angle compensation technology to improve the color cast phenomenon; when the picture region does not contain the preset color of the scene, the color output correction value corresponding to the picture region is 0, and the color of the picture region is not processed.

Since portrait scenes, blue sky scenes, and grass scenes are all fine-textured regions, the above processing method can further identify the specific region where the preset scenes such as portrait scenes are located on the basis of preliminary determining on preset scenes such as portrait scenes. Prevents false detection of colors similar to the preset colors in the preset scene, effectively improve the accuracy of data extraction of the preset colors of the preset scene, and reduce an over-detection rate and a false-detection rate.

After identifying the picture region with the preset color of the preset scene in the to-be-processed picture, as another way to acquire the color output correction value, a texture probability P corresponding to the picture region is assigned a value of 1. Moreover, only for the picture region containing the preset color of the preset scene, the corresponding color data is extracted, and Gaussian model fitting processing is used to acquire the Gaussian probability corresponding to the picture region, wherein the Gaussian probability is the color output correction value corresponding to the picture region.

Specifically, the color output correction value can be implemented by using the following algorithm:

$$\text{gauss}_{out} = \text{gauss}(cb, cr) * P \tag{17}$$

In the above formula, $\text{gauss}_{out}$ is the color output correction value for the preset color of the preset scene in the to-be-processed picture, gauss(cb, cr) are the Gaussian probabilities of the preset color of the preset scene in the to-be-processed picture, and P is the texture probability of each picture region in the preset color of the preset scene in the to-be-processed picture, or the texture probability of the picture region containing the preset color of the preset scene in the to-be-processed picture.

When this method is used for processing, there is no need to collect data for the picture region that does not contain the preset color of the preset scene, and there is no need to perform Gaussian model fitting processing for this part of the region, which can simplify the data processing process and reduce the complexity of data processing.

Further, when the to-be-processed picture is processed, the brightness data of the preset color of the preset scene of the to-be-processed picture can be used to further improve the accuracy of the preset color detection of the preset scene of the to-be-processed picture.

Figure 4:
FIG. 4 is a probability effect diagram of a processing skin color of a portrait scene, blue color of a blue sky scene, and green color of a grass scene of the image processing method provided in one embodiment of the present application.

Specifically, the brightness of the preset color of the preset scene can be divided into a plurality of brightness intervals according to the brightness data. In different brightness intervals, different linear adjustment models are used to perform correction or suppression adjustment of the brightness data of the color data of the corresponding preset color, can reduce the flicker problem that may occur in the data collection of low grayscale images, and can further improve the accuracy of the color data processing for the preset colors of the preset scene. Refer to FIG. 3, wherein FIG. 3(a) is an original figure, FIG. 3(b) is a comparison figure of using the image processing method of the embodiment of the present application to detect the color of the skin color of the preset scene of FIG. 3(a), FIG. 3(c) is a detailed figure of FIG. 3(b), wherein the positions indicated by the frames of d, e, and f in the diagrams (a), (b), and (c) of FIG. 3 correspond one-to-one respectively. FIG. 4(a) is an original figure, and FIG. 4(b) is a probabilistic effect diagram of FIG. 4(a) by using the detection processing of the skin color of the preset scene, the blue color of the blue sky scene, and the green color of the grass scene of the image processing method of the embodiment of the present application.

The linear adjustment model can be specifically expressed as follows:

$$K(y) = \begin{cases} k_1 * y + l_1, & y \leq 30 \\ k_2 * y + l_2, & 30 < y \leq 60 \\ k_3 * y + l_3, & 60 < y \leq 90 \\ k_4 * y + l_4, & 90 < y \end{cases} \quad (18)$$

In the above formula (18), K(y) is the brightness adjustment probability of the brightness data of the preset color of the preset scene after being corrected by the linear adjustment model, y is the brightness data of the preset color of the preset scene, and k1, k2, k3, K4, l1, l2, l3, and l4 are setting parameters respectively.

k1, k2, k3, k4, l1, l2, l3, l4 can be set according to the probability of setting different brightness intervals; in actual applications, it can also be adjusted according to the actual brightness of the applied panel. For example, k1, k2, k3, k4, l1, l2, l3, and l4 can be initially set according to the following assignments, and the linear adjustment model can be expressed as:

$$K(y) = \begin{cases} k_1 * y + l_1, (k_1, l_1) = \left(\frac{1}{300}, 0\right), & y \leq 30 \\ k_2 * y + l_2, (k_2, l_2) = \left(\frac{1}{100}, -\frac{1}{5}\right), & 30 < y \leq 60 \\ k_3 * y + l_3, (k_3, l_3) = \left(\frac{1}{50}, -\frac{4}{5}\right), & 60 < y \leq 90 \\ k_4 * y + l_4, (k_4, l_4) = (0, 1), & 90 < y \end{cases} \quad (19)$$

After the brightness suppression adjustment of the to-be-processed picture by the linear adjustment model, comprehensively processing the obtained brightness adjustment probability, the Gaussian probability, and the texture probability P of the picture region of the preset color of the preset scene in the to-be-processed picture, can effectively improve the accuracy of data processing, and reduce a rate of over-detection and false-detection, which can be implemented by the following algorithm:

$$\text{gauss}_{out} = \text{gauss}(cb, cr) * P * K(y) \quad (20)$$

$\text{gauss}_{out}$ is the color output correction value for the preset color of the preset scene in the to-be-processed picture, gauss(cb, cr) are the Gaussian probabilities of the preset color of the preset scene in the to-be-processed picture, and P is the texture probability of each of the picture region with respect to the preset color of the preset scene, or the texture probability of the picture region containing the preset color of the preset scene in the to-be-processed picture, K(y) is the brightness adjustment probability after the linear adjustment model is corrected the brightness data about the preset color of the preset scene.

After acquiring the color output correction value of the preset color of the preset scene in the to-be-processed picture, the color output correction value can be applied to the viewing angle compensation technology. The specific implementation process is not specifically limited in the embodiment of the present application, for example, the processing process can be briefly described as follows:

Expanding the RGB pixel values of the to-be-processed picture, and change the aspect ratio of the to-be-processed picture from m*n to the IRGB aspect ratio of the picture to m*(n*3);

Using s=6 sub-pixels as a partition in the expanded image, and there are a total of ss=(n*3)/s partitions;

If m is an odd row, and mod(s/3)=1, index the table value of R pixel, $V_{table} = H_R$;

If m is an even-numbered row, and mod(s/3)=1, index the table value of R pixel, $V_{table} = L_R$;

If m is an odd row and mod(s/3)=2, index the table value of G pixel, $V_{table} = H_G$;

If m is an even-numbered row and mod(s/3)=2, index the table value of G pixel, $V_{table} = L_G$;

If m is an odd row, and mod(s/3)=0, the table value of index B pixel, $V_{table} = H_B$;

If m is an even-numbered row and mod(s/3)=0, the table value of index B pixel, $V_{table} = L_R$; and calculating the output result of the View Angle Compensation (VAC) algorithm:

$$\text{out} = I_{RGB} + \text{gauss}_{out} * (V_{table} - I_{RGB}) \quad (21)$$

Viable is a drive voltage set by the built-in table of the drive mode in the indexed viewing angle compensation technology, $I_{RGB}$ is a RGB value of the to-be-processed picture, and $L_R$, $H_R$, $L_G$, $L_B$, and $H_B$ are setting values of the RGB channel in the built-in drive table modes in the viewing angle compensation technology.

The embodiment of the present application also provides an image processing device, including:

a data acquisition unit configured to acquire a first to-be-processed chromaticity data set and a second to-be-processed chromaticity data set regarding preset colors of a to-be-processed picture;

a first data processing unit configured to acquire a Gaussian probability of the preset color of the preset scene from a constructed Gaussian model according to the first to-be-processed chromaticity data set and the second to-be-processed chromaticity data set;

a texture identification unit configured to identify a picture region containing the preset scene in the to-be-processed picture; and a second data processing unit configured to acquire a color output correction value of the preset color of the preset scene of the picture region according to the Gaussian probability to perform a compensation processing on the preset color of the preset scene of the to-be-processed picture.

The image processing device establishes a Gaussian model of the preset color according to the first initial chromaticity data set and the second initial chromaticity data set of the preset color of the preset scene of the to-be-processed picture.

Specifically, the image processing device further includes a brightness adjustment unit configured to acquire brightness data of the preset color in the to-be-processed picture; determining a brightness interval of the brightness data; c retrieving a linear adjustment model of the brightness interval; acquiring a brightness adjustment probability of a brightness of the to-be-processed picture according to the linear adjustment model and the brightness data. At this time, the data processing unit is configured to acquire the color output correction value of the preset color of the preset scene of the picture region according to the brightness adjustment probability and the Gaussian probability to perform the compensation processing on the preset color of the preset scene of the to-be-processed picture.

In the image processing device, performing fitting processing on the preset colors of the preset scene by the constructed Gaussian model, and according to whether the to-be-processed picture contains the preset scene, correcting the correlation coefficient of the corresponding preset scene, and adjusts the Gaussian probability of the preset color of the preset scene based on the Gaussian model, after the image is processed for viewing angle compensation, the display transition of the preset color is natural when the image is displayed, the display transition of the preset color conforms to the visual characteristics of the human eye, and can effectively improve the color cast phenomenon. It can also improve the processing efficiency of the to-be-processed picture, and improve an accuracy of color detection, so as to prevent colors in other scenes that are similar to the preset colors of the preset scene from misdetection. In addition, the color data after the Gaussian model fitting process has natural color transitions, small lattice, higher picture quality, in line with human visual characteristics, and provides better viewing experience.

The embodiment of the present application also provides a computer device, including:
  one or more processors;
  a memory; and
  one or more application programs, wherein the one or more application programs are stored in the memory and configured to be executed by the processor to implement the above-mentioned image processing method.

The computer device may be an independent server, or a server network or server cluster composed of servers. For example, the computer device described in the embodiment of the present application includes but is not limited to a computer, a network host, a single network server, and a plurality of cloud server consisting of a network server set or a plurality of servers, wherein the cloud server is composed of a large number of computers or network servers based on cloud computing.

It can be understood that the computer device used in the embodiment of the present application may be a device including both receiving and transmitting hardware, that is, a device having receiving and transmitting hardware capable of performing two-way communication on a two-way communication link. Such devices may include cellular or other communication devices with single-line displays or multi-line displays or cellular or other communication devices without multi-line displays. The specific computer device may be a desktop terminal or a mobile terminal, and the computer device may also be a mobile phone, a tablet computer, a notebook computer, or the like.

Figure 5:
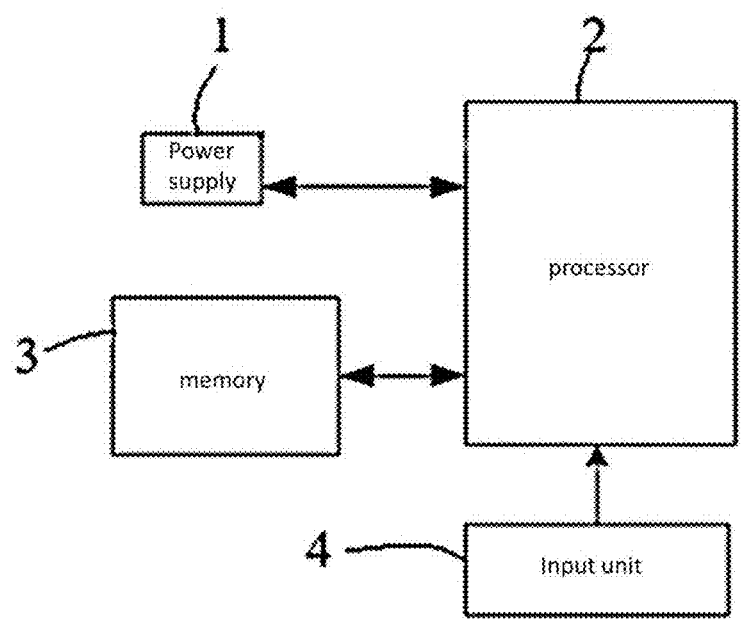
FIG. 5 is a schematic structural diagram of a computer device in one embodiment of the present application.

The computer device may include one or more processing core processors 2, one or more memories 3, a power supply 1, and an input unit 4 and other components. Those skilled in the art can understand that the structure of the computer device shown in FIG. 5 does not constitute a limitation on the computer device, and may include more or less components than those shown in the figure, or a combination of certain components, or different component arrangements.

The processor 2 is a control center of the computer device. It uses various interfaces and lines to connect the various parts of the entire computer device, runs or executes the target files and/or modules stored in the memory 3, and retrieve the target file executes various functions of the computer device and processes the data, so as to monitor the computer device as a whole. Optionally, the processor 2 may include one or more processing cores. Preferably, the processor 2 may integrate an application processor and a modem processor, wherein the application processor mainly processes the operating system, user interface, application programs, etc., the modem processor mainly processes wireless communication. It can be understood that the above-mentioned modem processor may not be integrated into the processor 2.

The memory 3 can be used to store target files and modules such as software programs, and the processor 2 executes various functional applications and data processing by running the target files and modules stored in the memory 3. The memory 3 may mainly include a storage program region and a storage data region. The storage program region may store an operating system, an application program required by at least one function, such as a sound playback function, an image playback function, etc., the storage data region may store data according to data created by the operation of computer device, etc. In addition, the memory 3 may include a high-speed random access memory, and may also include a non-volatile memory, such as at least one magnetic disk storage device, a flash memory device, or other volatile solid-state storage devices. Correspondingly, the memory 3 may also include a memory controller to provide the processor 2 with access to the memory 3.

The computer device also includes the power supply 1 for supplying power to various components. Preferably, the power supply 1 can be logically connected to the processor 2 through a power management system, so that functions such as charging, discharging, and power consumption management can be managed through the power management system. The power supply 1 may also include any components such as one or more DC or AC power supplies, a recharging system, a power failure detection circuit, a power converter or inverter, and a power status indicator.

The computer device may further include the input unit 4, which can be used to receive inputted digital or character information and generate keyboard, mouse, joystick, optical or trackball signal input related to user settings and function control.

Although not shown, the computer device may also include a display unit, etc., which will not be repeated here. Specifically, in this embodiment, the processor 2 of the computer device will load an executable file corresponding to the process of one or more application programs into the memory 3 according to the following instructions, and the processor 2 will operate and store the target file stored in the memory 3.

The present application provides an image processing method, an image processing device, and a computer device, wherein the image processing method uses the constructed Gaussian model to perform fitting processing on the preset colors of the preset scene, corrected by a correlation coefficient of the corresponding preset scene according to whether the preset scene is contained in the to-be-processed picture, and adjusts the Gaussian probability of the preset color of the preset scene obtained according to the Gaussian model. After performing the viewing angle compensation on the picture, the display transition of the preset color is natural when the picture is displayed. It conforms to the human visual characteristics, can effectively improve the color cast phenomenon and the processing efficiency of the to-be-processed picture, and improve an accuracy of color detection to prevent colors in other scenes that are similar to the preset colors of the preset scene from misdetection. At the same time, since only the preset colors of the preset scene in the to-be-processed picture are processed, when the picture is output, it can also effectively reduce a grid feeling and improve a quality of the picture.

In the above-mentioned embodiments, the description of each embodiment has its own emphasis. For a part that is not described in detail in one embodiment, please refer to the detailed description of other embodiments above, which will not be repeated here.

During specific implementation, each of the above units or structures can be implemented as independent entities, or can be combined arbitrarily, and implemented as the same or several entities. For the specific implementation of each of the above units or structures, please refer to the previous method embodiments, which will not be repeated here.

For the specific implementation of the above operations, please refer to the previous embodiments, which will not be repeated here.

In the present application, specific embodiments are used to illustrate the principles and implementation of the present application. The description of the above embodiments is only used to help understand the method and core idea of the present application. At the same time, for those skilled in the art, according to the idea of the present application, there will be changes in the specific implementation and the scope of application. In summary, the content of this specification should not be construed as a limitation of the present application.

What is claimed is:

1. An image processing method, comprising:
acquiring a first to-be-processed chromaticity data set and a second to-be-processed chromaticity data set of a preset color of a to-be-processed picture;
acquiring a first initial chromaticity data set and a second initial chromaticity data set of a preset color of a preset scene of a preprocessed picture;
establishing a Gaussian model of the preset color according to the first initial chromaticity data set and the second initial chromaticity data set, comprising:
acquiring mean values of the first initial chromaticity data set and the second initial chromaticity data set respectively;
acquiring a covariance matrix regarding the first initial chromaticity data and the second initial chromaticity data, an inverse of the covariance matrix, and a rank of covariance matrix; and
establishing the Gaussian model according to the covariance matrix, the inverse of the covariance matrix, and the rank of the covariance matrix;
acquiring a Gaussian probability of the preset color of a preset scene according to the first to-be-processed chromaticity data set and the second to-be-processed chromaticity data set, comprising:
acquiring the Gaussian probability of the preset color of the preset scene by the Gaussian model according to the first to-be-processed chromaticity data set and the second to-be-processed chromaticity data set;
identifying a picture region in the to-be-processed picture that contains the preset color of the preset scene; and
acquiring a color output correction value of the preset color of the preset scene of the picture region according to the Gaussian probability to perform a compensation processing on the preset color of the preset scene of the to-be-processed picture.

2. The image processing method according to claim 1, further comprising:
acquiring a brightness data of the preset color of the to-be-processed picture;
determining a brightness interval of the brightness data;
retrieving a linear adjustment model of the brightness interval;
acquiring a brightness adjustment probability of a brightness of the to-be-processed picture according to the linear adjustment model and the brightness data; and
acquiring the color output correction value of the preset color of the preset scene of the picture region according to the brightness adjustment probability and the Gaussian probability to perform the compensation processing on the preset color of the preset scene of the to-be-processed picture.

3. The image processing method according to claim 1, wherein the step of acquiring the first initial chromaticity data set and the second initial chromaticity data set of the preset color of the preset scene of the preprocessed picture comprises:
acquiring a plurality of preprocessed pictures containing the preset scene; and
extracting color data of the preset color of the preset scene in any of the preprocessed pictures, and acquiring the first initial chromaticity data set and the second initial chromaticity data set.

4. The image processing method according to claim 1, wherein the preset scene comprises one or more of portraits, blue sky, grass, food, animals, and buildings.

5. The image processing method according to claim 1, wherein the step of acquiring the first initial chromaticity data set and the second initial chromaticity data set of the preset color of the preset scene of the preprocessed picture comprises:
acquiring a plurality of first preprocessed pictures containing preset scene of portraits;
extracting data of skin color of the plurality of first preprocessed pictures; and
decomposing the skin color data to obtain a first initial chromaticity data set and a second initial chromaticity data set of the skin color data.

6. The image processing method according to claim 1, wherein the step of acquiring the first to-be-processed chromaticity data set and the second to-be-processed chromaticity data set of the preset color of the to-be-processed picture comprises:
extracting data of the preset color of the to-be-processed picture;
decomposing the data of the preset color; and
acquiring the first to-be-processed chromaticity data set and the second to-be-processed chromaticity data set of the preset color.

7. The image processing method according to claim 1, wherein the step of acquiring the Gaussian probability of the preset color of the preset scene comprises:
determining whether the to-be-processed picture contains the preset scene;
assigning a value to a correlation coefficient of the preset scene of the to-be-processed picture according to a result of determining whether the to-be-processed picture contains the preset scene;

acquiring the initial probability of the preset color according to the Gaussian model of any one of the preset colors of the to-be-processed picture; and acquiring the Gaussian probability of the preset scene of the to-be-processed picture according to the initial probability and the correlation coefficient.

8. The image processing method according to claim 7, wherein there are a plurality of preset scenes and a plurality of preset colors; and after the initial probability of any one of the plurality of the preset scenes is corrected by the correlation coefficient, the method comprises:

calculating a sum of the initial probabilities corrected by the correlation coefficient of the plurality of preset scenes of the to-be-processed picture and acquiring the Gaussian probabilities of the plurality of preset scenes of the to-be-processed picture.

9. The image processing method according to claim 7, wherein the step of acquiring the Gaussian probability of the preset color of the preset scene further comprises:

determining whether the to-be-processed picture contains the preset scene; and if the preset scene does not exist in the to-be-processed picture, the correlation coefficient of the preset scene of the to-be-processed picture is assigned a value of 0.

10. The image processing method according to claim 1, wherein the step of identifying a picture region in the to-be-processed picture that contains the preset color of the preset scene comprises:

dividing the to-be-processed picture into a plurality of the picture regions;

obtaining a pixel gradient of any of the picture regions;

counting a number of pixels with a pixel gradient greater than a first preset threshold in any one of the picture regions;

determining whether the number of pixels is greater than a second preset threshold; and if the number of pixels is greater than the second preset threshold, the picture region is determined to be the picture region containing the preset color of the preset scene.

11. The image processing method according to claim 10, wherein the step of obtaining the pixel gradient of any of the picture regions comprises:

extracting pixel values of any of the picture regions; and calculate the pixel gradient of the picture region according to the pixel values.

12. The image processing method according to claim 10, wherein the step of acquiring the color output correction value of the preset color of the preset scene of the picture region according to the Gaussian probability comprises:

acquiring a first texture probability of the picture region if the number of pixels is greater than the second preset threshold;

acquiring a second texture probability of the picture region if the number of pixels is less than the second preset threshold; and for any one of the picture regions, acquiring a product of the Gaussian probability of the preset color of the picture region with respect to the preset scene and the first texture probability or the second texture probability to acquire the color output correction value of the preset color of the preset scene of the picture region.

13. The image processing method according to claim 10, wherein the step of acquiring the color output correction value of the preset color of the preset scene of the picture region according to the Gaussian probability comprises:

acquiring a first texture probability of the picture region that contains the preset color of the preset scene;

acquiring a product of the first texture probability and the Gaussian probability of the picture region containing the preset scene to acquire the color output correction value of the preset color of the preset scene of the picture region.

14. The image processing method according to claim 1, wherein the step of identifying the picture region in the to-be-processed picture that contains the preset color of the preset scene comprises:

acquiring brightness data of the to-be-processed picture;

dividing brightness of the preset color of the preset scene into a plurality of brightness intervals according to the brightness data; and performing a correcting adjustment or a suppressing adjustment on the brightness data of the preset color in the brightness interval to obtain the brightness adjustment probability.

15. An image processing device, comprising:

a first data acquisition unit configured to acquire a first to-be-processed chromaticity data set and a second to-be-processed chromaticity data set regarding preset colors of a to-be-processed picture;

a second data acquisition unit configured to acquire a first initial chromaticity data set and a second initial chromaticity data set of a preset color of a preset scene of a preprocessed picture;

a Gaussian model establishing unit configured to establish a Gaussian model of the preset color according to the first initial chromaticity data set and the second initial chromaticity data set, comprising:

acquiring mean values of the first initial chromaticity data set and the second initial chromaticity data set respectively;

acquiring a covariance matrix regarding the first initial chromaticity data and the second initial chromaticity data, an inverse of the covariance matrix, and a rank of covariance matrix; and establishing the Gaussian model according to the covariance matrix, the inverse of the covariance matrix, and the rank of the covariance matrix;

a first data processing unit configured to acquire a Gaussian probability of the preset color of the preset scene from a constructed Gaussian model according to the first to-be-processed chromaticity data set and the second to-be-processed chromaticity data set, comprising:

acquiring the Gaussian probability of the preset color of the preset scene by the Gaussian model according to the first to-be-processed chromaticity data set and the second to-be-processed chromaticity data set;

a texture identification unit configured to identify a picture region containing the preset scene in the to-be-processed picture; and a second data processing unit configured to acquire a color output correction value of the preset color of the preset scene of the picture region according to the Gaussian probability to perform a compensation processing on the preset color of the preset scene of the to-be-processed picture.

16. The image processing device according to claim 15, wherein the image processing device further comprises a brightness adjustment unit configured to acquire brightness data of the preset color in the to-be-processed picture.

17. A computer device, which comprises:
one or more processors;
a memory; and
one or more application programs, wherein the one or more application programs are stored in the memory and configured to be executed by the processor to implement the image processing method according to claim 1.

18. The computer device according to claim 17, wherein the computer device further comprises a power source and an input unit, and wherein the power source is logically connected to the processor by a power management system.

19. The image processing method according to claim 14, wherein the step of acquiring the color output correction value of the preset color of the preset scene of the picture region according to the Gaussian probability comprises:
acquiring a first texture probability of the picture region that contains the preset color of the preset scene;
acquiring a product of the brightness adjustment probability, the first texture probability, and the Gaussian probability of the picture region containing the preset scene to acquire the color output correction value of the preset color of the preset scene of the picture region.

\* \* \* \* \*